July 27, 1926.

E. C. ALBRIGHT 1,593,555

SPRING NUT FASTENER

Filed Feb. 8, 1926

INVENTOR.
EDWARD C. ALBRIGHT.

BY *Lockwood & Lockwood*

ATTORNEYS.

Patented July 27, 1926.

1,593,555

UNITED STATES PATENT OFFICE.

EDWARD C. ALBRIGHT, OF CONNERSVILLE, INDIANA, ASSIGNOR TO INDIANA LAMP CORPORATION, OF CONNERSVILLE, INDIANA, A CORPORATION.

SPRING NUT FASTENER.

Application filed February 3, 1926. Serial No. 86,868.

This invention pertains to a tensioning screw, particularly adapted for resiliently securing a lamp door to a casing under spring tension.

The principal feature of the invention resides in the provision of a slidable but nonrotatable nut supported by the casing of the lamp into which a screw bolt is adapted to screw, said bolt having a head adapted to engage with the lamp door to be held in place, said screw bolt being surrounded by a compression spring positioned intermediate a suitable flange on the casing and said nut, whereby upon rotating the screw bolt, the nut causes the spring to be compressed and exert a pressure on the nut which will be transmitted through the screw bolt to the door.

The full nature of the invention will be understood from the accompanying drawings and the following description and claims.

Figure 1:
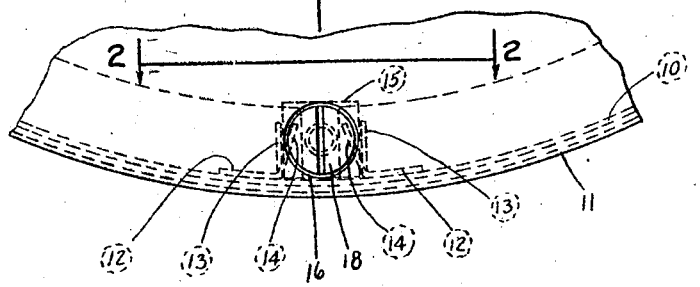
Figure 2:
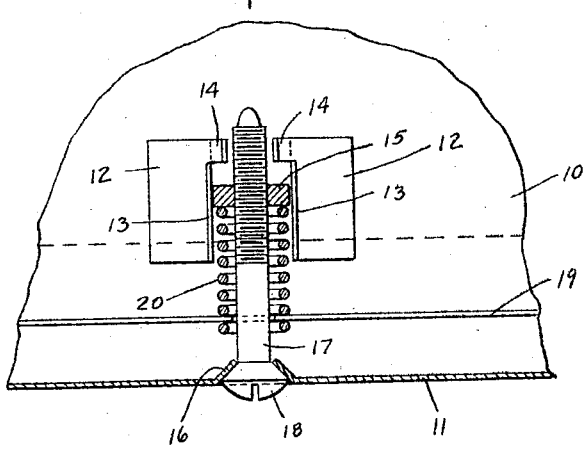

In the drawings, Figure 1 is a front elevation of a portion of a lamp structure. Fig. 2 is a section taken on the line 2—2 of Fig. 1.

In the drawings there is shown a lamp casing 10 and a lamp door or lens rim 11 adapted to be secured thereto. Rigidly connected with the interior surface of the casing there is a pair of guide plates 12 provided with upwardly extending flanges 13, the end portions of which are cut and bent forwardly to form the ears 14. Mounted intermediate the upturned flanges 13 so as to slide therebetween but be held against rotation thereby, there is a square nut 15 of the usual character, the rear movement of said nut being limited by the inwardly bent ears 14.

The door 11 is formed with a recess opening 16 through which a screw bolt 17 extends, the head 18 of the screw bolt seating in the recess opening. Said screw bolt is adapted to extend through a flange 19 provided on the casing and screwed through the nut 15. Intermediate the nut 15 and the flange 19, there is provided a compression spring 20, which is shown herein with one loop embracing the flange.

When in inoperative position, with the screw bolt out of engagement with the nut, the nut is held in position against the ears 14 by the spring 20. When it is desired to secure the door to the casing, said door is placed in position, and the screw bolt is inserted and screwed into the nut 5, so as to compress the spring 20. Such compression causes a pressure to be exerted by the spring against the nut 15, which transmits the spring pressure to the screw bolt 17 and through the head thereof to the door, thus holding it under such pressure directly against the casing.

The invention claimed is:—

1. The combination with a stationary member and a removable member, of a guide element rigidly secured to said stationary member, a nut slidably but non-rotatably mounted in said guide element, a compression spring positioned intermediate said nut and stationary member, and a screw bolt extending through said removable member having its head in engagement therewith adapted to screw into said nut for compressing said spring and securing said removable member to said stationary member under spring tension.

2. The combination with a stationary member and a removable member, of a nut slidably but non-rotatably mounted on said stationary member, a compression spring positioned intermediate said nut and stationary member, and a screw bolt extending through said removable member having its head in engagement therewith and adapted to screw into said nut for compressing said spring and securing said removable member to said stationary member under spring tension.

3. The combination with a stationary member and a removable member, of a guide element rigidly secured to said stationary member, a nut slidably but non-rotatably mounted in said guide element, means on said guide element for limiting the sliding movement of said nut in one direction, a compression spring positioned intermediate said nut and stationary member so as to normally maintain said nut against said element, and a screw bolt extending through said removable member having its head in engagement therewith adapted to screw into said nut for compressing said spring and securing said removable member to said stationary member under spring tension.

4. The combination with a stationary member and a removable member, of a pair of flange elements secured to said stationary member and extending outwardly from the surface thereof, a nut slidably but non-rotatably mounted between said flange elements, ears formed on said flange elements extending towards each other for limiting the movement of said nut in one direction, a compression spring positioned intermediate said nut and said stationary member and having one end normally connected with the latter for holding the nut against said ears, and a screw bolt adapted to screw into said nut for drawing it against the compression of said spring and thereby securing said removable member to said stationary member under spring tension.

In witness whereof, I have hereunto affixed my signature.

EDWARD C. ALBRIGHT.